United States Patent
Hughes et al.

(10) Patent No.: US 7,840,873 B2
(45) Date of Patent: Nov. 23, 2010

(54) PARTIAL CRC INSERTION IN DATA PACKETS FOR EARLY FORWARDING

(75) Inventors: William A. Hughes, San Jose, CA (US);
Chen-Ping Yang, Fremont, CA (US);
Greggory D. Donley, San Jose, CA (US); Michael K. Fertig, Sunnyvale, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1014 days.

(21) Appl. No.: 11/610,219

(22) Filed: Dec. 13, 2006

(65) Prior Publication Data

US 2008/0148135 A1 Jun. 19, 2008

(51) Int. Cl.
*H03M 13/00* (2006.01)
(52) U.S. Cl. .................. 714/758; 714/776; 714/774
(58) Field of Classification Search ............ 714/776, 714/758, 774
See application file for complete search history.

(56) References Cited

U.S. PATENT DOCUMENTS

| | | | |
|---|---|---|---|
| 4,937,828 A | 6/1990 | Shih et al. | |
| 5,054,025 A * | 10/1991 | Galand et al. | 714/800 |
| 5,430,738 A | 7/1995 | Tsuda | |
| 5,617,541 A * | 4/1997 | Albanese et al. | 709/207 |
| 5,745,837 A | 4/1998 | Fuhrmann | |
| 5,951,707 A * | 9/1999 | Christensen et al. | 714/752 |
| 5,968,201 A * | 10/1999 | Shida et al. | 714/795 |
| 5,995,171 A | 11/1999 | Enari et al. | |
| 6,085,253 A | 7/2000 | Blackwell et al. | |
| 6,111,924 A | 8/2000 | McKinley | |
| 6,148,422 A | 11/2000 | Strawczynski et al. | |
| 6,161,207 A * | 12/2000 | Lockhart et al. | 714/758 |
| 6,173,431 B1 * | 1/2001 | Rittle | 714/778 |
| 6,182,267 B1 * | 1/2001 | Kidd et al. | 714/807 |
| 6,330,700 B1 | 12/2001 | Morris et al. | |
| 6,385,451 B1 | 5/2002 | Kalliokulju et al. | |
| 6,449,654 B1 | 9/2002 | Blackwell et al. | |
| 6,519,259 B1 | 2/2003 | Baker et al. | |
| 6,522,665 B1 | 2/2003 | Suzuki et al. | |

(Continued)

OTHER PUBLICATIONS

Non-final Office Action mailed Mar. 12, 2009 in U.S. Appl. No. 11/610,191 Entitled: "Command Packet Packing to Mitigate CRC Overhead".

(Continued)

*Primary Examiner*—M. Mujtaba K Chaudry
(74) *Attorney, Agent, or Firm*—Lawrence J. Merkel; Meyertons, Hood, Kivlin, Kowert & Goetzel, P.C.

(57) ABSTRACT

In an embodiment, a node comprises a packet scheduler configured to schedule a packet to be transmitted on the link, the packet comprising a command and associated packet data. Coupled to the packet scheduler and configured to transmit the packet on the link, and interface circuit is configured to generate error detection data covering the packet. The interface circuit is configured to transmit the error detection data covering the packet at an end of the packet, and is further configured to insert at least one partial error detection data within the packet. The partial error detection data covers a portion of the packet that precedes the partial error detection data. A receiver is configured to receive the data and forward the data based on partial CRC check.

21 Claims, 9 Drawing Sheets

U.S. PATENT DOCUMENTS

| | | | |
|---|---|---|---|
| 6,539,503 | B1 | 3/2003 | Walker |
| 6,856,628 | B1 * | 2/2005 | Bychowsky et al. ........ 370/412 |
| 6,950,977 | B2 | 9/2005 | Lavi et al. |
| 7,185,266 | B2 * | 2/2007 | Blightman et al. .......... 714/776 |
| 7,210,088 | B2 | 4/2007 | Chen et al. |
| 7,219,294 | B2 | 5/2007 | Vogt |
| 7,263,644 | B2 | 8/2007 | Park et al. |
| 7,324,541 | B2 | 1/2008 | Muthukrishnan et al. |
| 7,379,467 | B1 | 5/2008 | Paul et al. |
| 2003/0067907 | A1 | 4/2003 | Rezaiifar et al. |
| 2004/0158793 | A1 * | 8/2004 | Blightman et al. .......... 714/758 |
| 2005/0138622 | A1 | 6/2005 | McAlpine et al. |
| 2007/0297351 | A1 | 12/2007 | Trainin |
| 2008/0148131 | A1 * | 6/2008 | Hughes et al. .............. 714/776 |
| 2008/0148135 | A1 | 6/2008 | Hughes et al. |

OTHER PUBLICATIONS

Non-final Office Action mailed Nov. 12, 2009 in U.S. Appl. No. 11/610,191 Entitled: "Command Packet Packing to Mitigate CRC Overhead".

XILINX, "HyperTransport Lite Interface for Virtex-II FPGAs," XAPP639, v1.0.1, Mar. 31, 2004, 13 pages.

IEEE News Briefs, "New Bust Technology Boosts Performance," 2001.

International Preliminary Report for PCT/US2007/025499 mailed Mar. 23, 2009.

Nicolas Cravotta, "RapidIO Versus HyperTransport: A Battle Between Equals or Unintentional Marketing Confusing?," Internet Article [Online], Jun. 27, 2002, XP002474026.

International Search Report for PCT/US2007/025499 mailed Jul. 4, 2008.

U.S. Appl. No. 11/610,191, filed Dec. 13, 2006.

Office Action from U.S. Appl. No. 11/610,191, mailed on May 11, 2010.

* cited by examiner

| CTL[3:0] | Definition |
|---|---|
| 1111 | Command Cell |
| 0000 | Data Cell |
| 0011 | Cmd CRC (For Dataless Packets) |
| 1100 | Data CRC, Last Cell of First Cmd for Packed Cmds |
| 0111 | First Cell of Cmd inserted in Data, First Cell of Second Packed Cmd |
| 1001 | Next Cell = Inserted Partial CRC After Data Movement Cmd |
| 1010 | Next Cell = Inserted Partial Data CRC |
| 1011 | Partial CRC |

| CTL Bit | Meaning |
|---|---|
| 0 | LCTL (identifies Cmd vs. Data) |
| 1 | For Cmd, ~Pack; For Data, Insert |
| 2 | HCTL (same as LCTL except for CRC, in which HCTL = ~LCTL) |
| 3 | RSVD |

Fig. 10

PARTIAL CRC INSERTION IN DATA PACKETS FOR EARLY FORWARDING

BACKGROUND

1. Field of the Invention

This invention is related to the field of interconnects for electronic systems such as computer systems.

2. Description of the Related Art

Electronic components in systems (such as integrated circuits and other electrical devices) communicate with each other over defined interfaces such as links between the components. Data is usually transmitted over the links with reference to a clock signal. That is, data is driven and sampled on the link responsive to the clock signal. Recently, double data rate links have been defined in which data is driven/sampled according to both the rising and falling edges of the clock signal.

The frequency of the clock associated with a link, along with its width (in bits of data transferred) defines the bandwidth on the link (the amount of data transferred per unit time). One way to increase bandwidth (and also decrease latency, for larger transfers) is to increase the clock frequency. However, as the frequency increases, the error rate also increases as factors such as noise, clock uncertainty, skew, rise and fall times, etc. become bigger factors in the shorter clock cycle. Viewed in another way, data is present on the link for a shorter period of time, and the margin for error is smaller. At some point, the error rate increases to a level that impacts reliability.

To mitigate the increased error rate, error detection (and possibly correction) can be implemented on the link. For example, a cyclical redundancy check (CRC) is often implemented on links. For CRC, each data transfer on the link is followed by a CRC code that is generated from the data. The receiver can generate the same CRC code, and compare the generated CRC code to the received code to detect an error. The receiver can report the error to the transmitter, which can retransmit the data or take other corrective action.

For relatively large data transfers, the addition of the CRC code to the end of the transfer doesn't impact bandwidth very much (since the added code is small compared to the data transferred). However, the CRC code does impact latency, as the receiver generally must store the entire data covered by the CRC until the CRC is received. If the CRC validates that the data is correct, then the data can be forwarded. In many cases, the first data in the transfer is the most critical (e.g. in caching systems in which the data that is currently requested is transferred first, followed by the remainder of the cache block for storage). In such cases, the increase in latency is a decrease in performance.

Furthermore, in coherent systems, many of the transfers between components are relatively small messages (e.g. probes searching for the most recent copies of the data, probe responses, done indications for source and target, etc.). The impact of the CRC on these small messages is significant, increasing the size of the messages by as much as 100% (for a message that is the same size as the CRC code). Size increases of 50% or 33% are common as well. In coherent systems, a large number of the transfers over the links are these small messages, so the increased bandwidth consumed to add the CRC is significant.

SUMMARY

In an embodiment, a node is configured to couple to a link and comprises a packet scheduler configured to schedule a packet to be transmitted on the link, and an interface circuit coupled to the packet scheduler. The packet comprises a command and associated packet data. The interface circuit is configured to transmit the packet on the link, and is configured to generate error detection data covering the packet. The interface circuit is configured to transmit the error detection data covering the packet at an end of the packet, and the interface circuit is further configured to insert at least one partial error detection data within the packet. The partial error detection data covers a portion of the packet that precedes the partial error detection data.

In an embodiment, a node is configured to couple to a link and comprises an interface circuit and a target for a packet. The interface circuit is coupled to receive a packet from the link, wherein the packet comprises a command, associated packet data, error detection data appended to an end of the packet, and at least one partial error detection data inserted within the packet. The interface circuit is configured to verify a portion of the packet received prior to the partial error detection data and, if no error is detected, the interface circuit is configured to forward the portion prior to receiving a remainder of the packet.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The description below refers to a computer system that implements error detection data on its links. However, any electronic system that communicates data on links between components can implement the description herein. Generally, a link may comprise a communication path from one component to another. The link may be bidirectional or unidirectional, in various embodiments. The link may have any width, and may have one or more clock cycles associated with it that clocks data on the link. Also, CRC will be used as an example of error detection data. Generally, CRC is generated as a combination of the data bits that are covered by the CRC, according to a predefined formula used by both the transmitter and the receiver. However, any error detection data may be used. Generally, the error detection data comprises redundant data that allows for detection (and optionally correction) of errors in the transmitted data. For example, error detection data may be parity based, or may be similar to various error detection/correction codes (ECC) used in memory systems, such those that correct single bit errors and detect double bit errors. ECCs that correct and detect larger numbers of errors may also be used. Error detection data can be based Hamming Codes or Reed-Solomon Codes, for example, or any other code defined to detect and/or correct errors. An instance of error detection data may be referred to as "covering" a set of data. The error detection data covers the data if an error in the data is detectable using the error detection data (although error detection data has limits, and thus a large enough error in the data may not be detected even though the error detection data covers the erroneous data).

Figure 1:
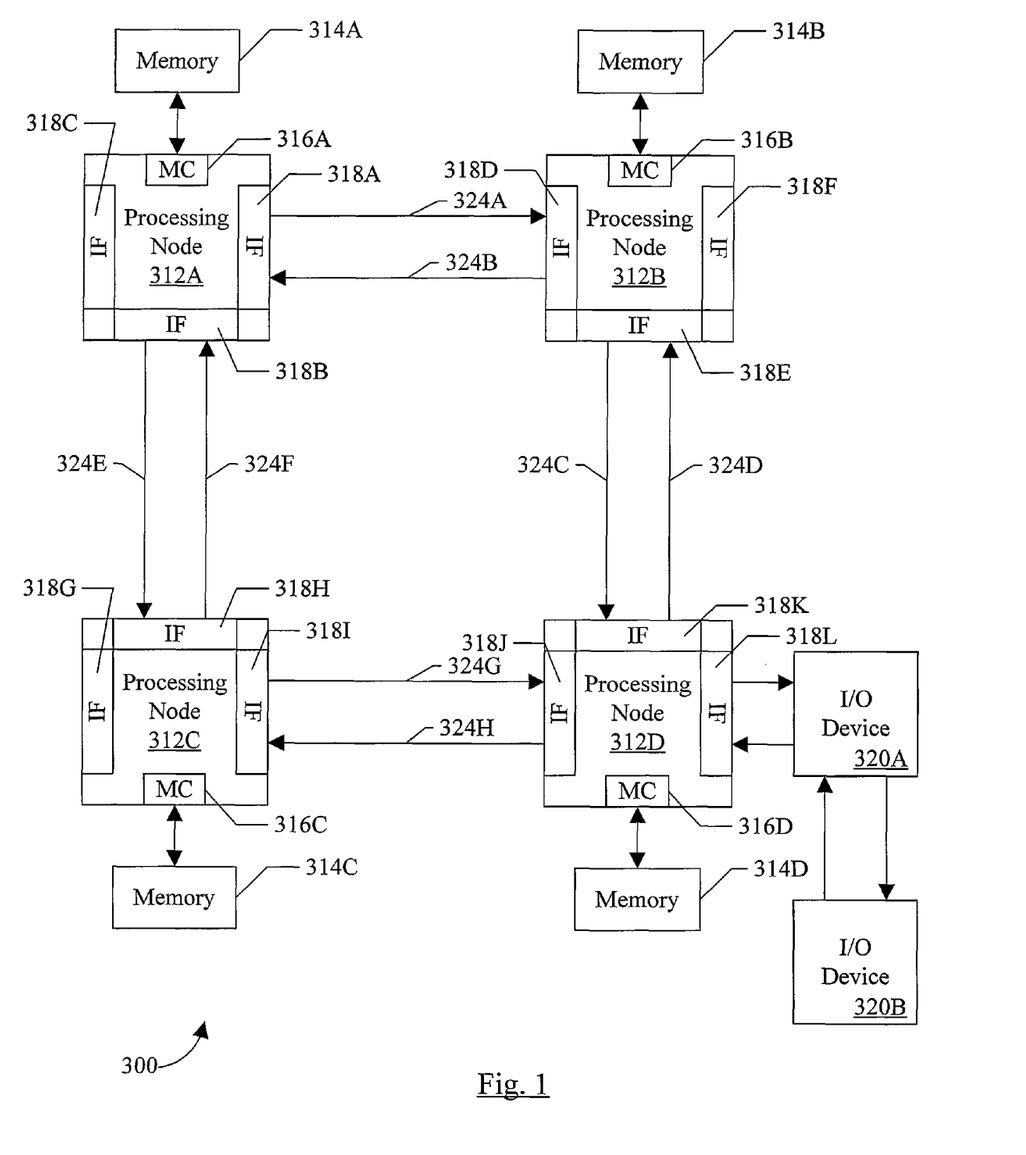
FIG. 1 is a block diagram of one embodiment of a computer system.

Turning now to FIG. 1, an embodiment of a computer system 300 is shown. In the embodiment of FIG. 1, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include an interface circuit to communicate between the processing nodes 312A-312D. For example, processing node 312A includes interface circuit 318A for communicating with processing node 312B, interface circuit 318B for communicating with processing node 312C, and interface circuit 318C for communicating with yet another processing node (not shown). Similarly, processing node 312B includes interface circuits 318D, 318E, and 318F; processing node 312C includes interface circuits 318G, 318H, and 318I; and processing node 312D includes interface circuits 318J, 318K, and 318L. Processing node 312D is coupled to communicate with a plurality of input/output devices (e.g. devices 320A-320B in a daisy chain configuration) via interface circuit 318L. Other processing nodes may communicate with other I/O devices in a similar fashion.

Processing nodes 312A-312D implement a packet-based interface for inter-processing node communication. In the present embodiment, the interface is implemented as sets of unidirectional links (e.g. links 324A are used to transmit packets from processing node 312A to processing node 312B and links 324B are used to transmit packets from processing node 312B to processing node 312A). Other sets of links 324C-324H are used to transmit packets between other processing nodes as illustrated in FIG. 1. Generally, each set of links 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 1. Any suitable routing algorithm may be used. Other embodiments of computer system 300 may include more or fewer processing nodes then the embodiment shown in FIG. 1.

Generally, the packets may be transmitted as one or more bit times on the links 324 between nodes. A given bit time may be referenced to the rising or falling edge of the clock signal on the corresponding clock lines. That is, both the rising and the falling edges may be used to transfer data, so that the data rate is double the clock frequency (double data rate, or DDR). The packets may include request packets for initiating transactions, probe packets for maintaining cache coherency, and response packets for responding to probes and requests (and for indicating completion by the source/target of a transaction). Some packets may indicate data movement, and the data being moved may be included in the data movement packets. For example, write requests include data. Probe responses with dirty data and read responses both include data. Thus, in general, a packet may include a command portion defining the packet, its source and destination, etc. A packet may optionally include a data portion following the command portion. The data may be a cache block in size, for coherent cacheable operations, or may be smaller (e.g. for non-cacheable reads/writes).

Processing nodes 312A-312D, in addition to a memory controller and interface logic, may include one or more processors. Broadly speaking, a processing node comprises at least one processor and may optionally include a memory controller for communicating with a memory and other logic as desired. One or more processors may comprise a chip multiprocessing (CMP) or chip multithreaded (CMT) integrated circuit in the processing node or forming the processing node, or the processing node may have any other desired internal structure. Any level of integration or any number of discrete components may form a node. Other types of nodes may include any desired circuitry and the circuitry for communicating on the links. For example, the I/O devices 320A-320B may be I/O nodes, in one embodiment.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface circuits 318A-318L may comprise a variety of buffers for receiving packets from the link and for buffering packets to be transmitted upon the link. Computer system 300 may employ any suitable flow control mechanism for transmitting packets. For example, in one embodiment, each interface circuit 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors may be implemented in a more traditional personal computer (PC) structure including one or more interfaces of the processors to a bridge to one or more I/O interconnects and/or memory.

In one embodiment, the links 324A-324H are compatible with the HyperTransport™ (HT) specification promulgated by the HT consortium, specifically version 3. The protocol on the links is modified from the HT specification to support coherency on the links, as described above. However, other embodiments may implement any links and any protocol thereon. Furthermore, the CRC techniques described herein may be used for non-coherent links as well.

Figure 2:
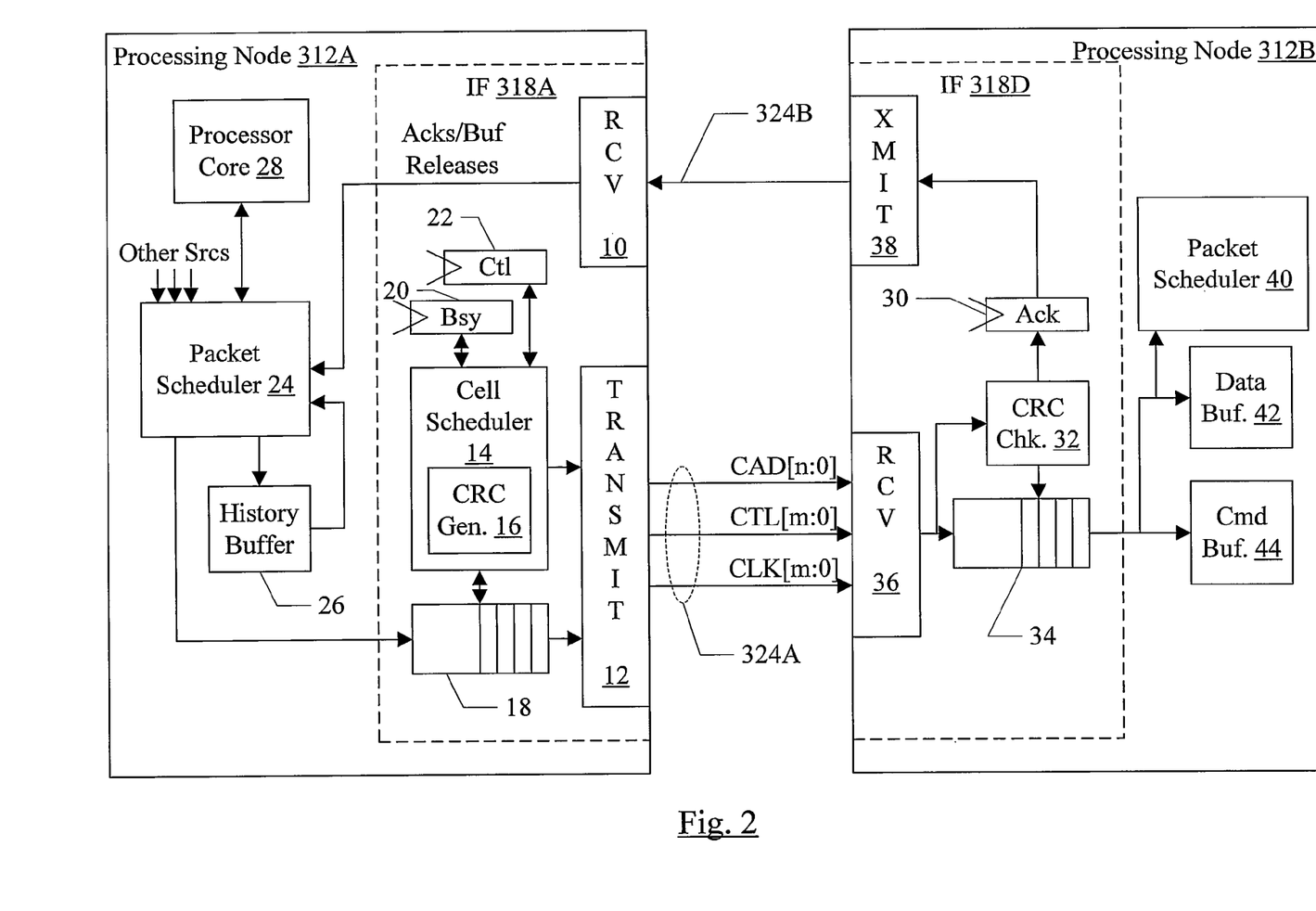
FIG. 2 is a block diagram of one embodiment of two nodes shown in FIG. 1, shown in greater detail.

Turning now to FIG. 2, a block diagram of one embodiment of the processing nodes 312A-312B is shown, illustrating additional details of one embodiment of the nodes. In the illustrated embodiment, the processing node 312A comprises the interface circuit 318A as shown in FIG. 1 as well as a packet scheduler 24, a history buffer 26, and a processor core 28. Particularly, the interface circuit 318A includes a receiver circuit 10, a transmit circuit 12, a cell scheduler 14 (including CRC generator 16), a cell queue 18, a busy counter 20, and one or more control registers 22. The receiver 10 is coupled to the link 324B to receive packets from the processing node 312B, and is coupled to the packet scheduler 24. The control register 22 and the busy counter 20 are coupled to the cell scheduler 14, which is coupled to the transmit circuit 12 and the cell queue 18. The cell queue 18 is coupled to the transmit circuit 12 and the packet scheduler 24. The transmit circuit 12 is coupled to the link 324A to transmit packets to the processing node 312B. The packet scheduler 24 is further coupled to the history buffer 26, the processor core 28, and various other packet sources.

The processing node 312B comprises the interface circuit 318D, as shown in FIG. 1, as well as a packet scheduler 40, a data buffer 42, and a command buffer 44. The interface circuit 318D comprises an acknowledgement (Ack) counter 30, a CRC check circuit 32, a cell queue 34, a receive circuit 36, and a transmit circuit 38. The receive circuit 36 is coupled to the link 324A, the cell queue 34, and the CRC check circuit 32. The CRC check circuit 32 is coupled to the Ack counter 30 (which is further coupled to the transmitter 38) and to the cell queue 34 (which is further coupled to the packet scheduler 40, the data buffer 42, and the command buffer 44). The transmit circuit 38 is coupled to the link 324B.

The link 324A is shown in greater detail in FIG. 2, and includes CAD[n:0], CTL[m:0], and CLK[m:0]. The CAD lines may carry packet bit times, and the CLK lines may comprise one or more clock lines to which the bit times are referenced. The CTL lines may indicate the type of data carried in a given bit time, as described in more detail below. There are n CAD lines, where n is an integer power of 2 multiple of 8 minus one. That is, n may be 7, 15, 31, etc. Thus, a power of 2 bytes may be transmitted on the CAD lines per bit time. There are m CLK and CTL lines, where m is equal to n+1 divided by 8. That is, there is one CLK line and one CTL line per byte of CAD. The CLK line is the clock reference for the corresponding 8 CAD lines.

While various embodiments may have varying widths, the minimum unit of transfer on the link may be defined as a cell. That is, no packet on the link is less than one cell in size, and packets are an integer multiple of cells long. A cell can be any size in various embodiments, but is 32 bits (4 bytes) in one embodiment. If the link is narrower than a cell, once a cell transmission begins, the remainder of that cell will be transmitted in succession. Thus, for example, a 32 bit cell and a 16 bit link may be implemented and each cell is transmitted as two successive bit times on the CAD lines.

The packet scheduler 24 may schedule a packet for transmission on the link 324A, and may transfer the packet's cells to the cell queue 18 (or may cause the packet's cells to be transferred to the cell queue 18, if they are not stored in the packet scheduler 24). The cell scheduler 14 may schedule cells from the cell queue 18 for transmission through the transmit circuit 12. Generally, cells of a packet may be scheduled during successive bit times, although some non-data movement packets may be scheduled within the data of a preceding data movement packet, in one embodiment. If a cell is scheduled, the cell scheduler 14 causes the cell queue 18 to output the cell to the transmit circuit 12, which transmit the cell on the link 324A (with appropriate CTL line encodings). If a cell is not scheduled, the cell scheduler 14 may schedule a no-operation (noop) command for transmission. The noop command may include buffer release fields, in one embodiment, to indicate that buffers are available in the node 312A to receive packets from the node 312B. The buffer release counts may be maintained by the interface circuit 318A, or may be provided by the packet scheduler 24, in various embodiments.

The cell scheduler 14 is configured to generate a CRC for each packet (using the CRC generator 14). By default, the cell scheduler 14 may append the CRC for a packet to the end of that packet, providing per-packet error detection on the link. In one embodiment, the CRC comprises one cell of data, although other embodiments may implement multiple cells of CRC. Subsequent to scheduling the last cell of the packet, the cell scheduler 14 may schedule the CRC cell(s).

In one embodiment, the interface circuit 318A (and more particularly the cell scheduler 14) may be configured to pack two or more packets together and cover them with one CRC. That is, rather than transmit a first packet and its CRC, then a second packet with its separate CRC, the cell scheduler 14 may transmit the first packet, followed by the second packet, followed by one transmission of CRC that covers both packets. Some embodiments may be configured to pack more than two packets (e.g. up to N packets, where N is an integer greater than or equal to 2). By packing packets together for one CRC transmission, the overhead of CRC transmissions on the interconnect may be reduced, as compared to pure per-packet CRC. Particularly for small packets, the reduction of CRC overhead may significantly reduce bandwidth consumption on the link. In one embodiment, packets may be packed if a packet is available for transmission (e.g. in the cell queue 18) at or near the end of transmission of the last cell of the previous packet. Particularly, in one embodiment, the cell scheduler 14 may schedule the last cell of a packet and determine if the CRC or another packet is to be scheduled based on whether or not a cell or cells of the other packet are in the cell queue 18.

In one specific embodiment, the cell scheduler 14 may be configured to pack packets that each include a command but exclude data (e.g. dataless packets, or command-only packets). Since there are frequently communications on a coherent link to maintain coherency that do not include data, the incidence of such packets may be high on a coherent link (although packing may also be implemented on a non-coherent link). On a coherent link, command-only packets may include probe requests, some probe responses, read requests, and done responses, for example. In one embodiment, command-only packets may comprise 1-3 cells, depending on the command and address size in the system. With a one cell CRC and two 1 cell commands, packing just two packets together for CRC transmission may result in a 25% reduction in bandwidth consumption (from 4 cells to 3 cells).

In one embodiment, the cell scheduler 14 may be configured to insert one or more partial CRC transmissions within a packet. Each partial CRC may cover the portion of the packet that precedes the insertion (cumulative to the beginning of the packet, even if other partial CRC insertions have been made). For example, a command and data packet may be lengthy, and forwarding of the first data transmitted may be important to performance. By inserting a partial CRC after the first data that would be forwarded, the first data may be validated with the partial CRC at the receiver and may be forwarded. If an error is detected in a later CRC, the forwarded data is still known to be valid and may be used. Thus performance may be improved by permitting the early forwarding of data, in some embodiments.

Various embodiments may implement both the CRC packing and the partial CRC insertion, or only one, as desired.

CRC packing and partial CRC insertion may be programmable in the control register 22. Specifically, packing and/or insertion may be enabled. If more than one packet may be packed, the maximum number of packets to pack may be programmable as well. If multiple partial CRC insertion points are supported within a packet, which insertion points to use may be programmable.

In one embodiment, the packing and partial CRC insertion may be controlled dynamically. Generally, the cell scheduler 14 may monitor the amount of bandwidth being consumed on the link 324A, and may adjust the CRC transmissions according to the bandwidth. In one embodiment, cells are transmitted each bit time on the link. If there are no cells to transmit, a noop command may be transmitted. Thus, the cell scheduler 14 may monitor noop commands as unconsumed bandwidth and other cells as consumed bandwidth (packet cells, CRC cells, etc.). If the bandwidth consumption is high (e.g. exceeds a threshold), CRC packing may be performed (if enabled) to reduce CRC bandwidth consumption. Additionally, partial CRC insertion may be temporarily stopped (or reduced, if multiple CRC insertions are performed). Bandwidth may be measured separately for CRC packing control and for partial CRC insertion control, if desired.

In the illustrated embodiment, the busy counter 20 may be used to track bandwidth. The counter may, e.g., be a saturating counter that is incremented for each non-noop cell and decremented for each noop cell. Thus, the busy counter is an approximation of recent bandwidth consumption. Based on the busy counter value, CRC packing and partial CRC insertion may be dynamically varied.

The receive circuit 36 may receive the cells from the link 324A. Based on encodings of the CTL lines and possibly decoding within the cell, the receive circuit 36 may determine that the cell is command or data in the packet (or an inserted command, a packed command, or partial CRC). The receive circuit 36 may store the received cells (and any decode/control data) in the cell queue 34, and may also pass the cell to the CRC check circuit 32. Eventually, a CRC cell is received and may be compared to the CRC generated by the CRC check circuit 32 to detect an error or validate the received cells. If there is no error, the CRC check circuit 32 may signal the cell queue 34 to forward the validated cells. Additionally, the CRC check circuit 32 may increment the Ack counter 30 if a complete packet has been received without error. The value of the Ack counter 30 may be transmitted (by the transmit circuit 38, as an Ack packet on the link 324B) to the processing node 312A to acknowledge successfully received packets. The processing node 312A may retain transmitted packets (e.g. via the history buffer 26) until they are known to be received accurately at the processing node 312B. When the Ack packet is received (and is provided by the receiver 10 to the packet scheduler 24), the corresponding packets may be deleted.

Generally, the interface circuit 318D may forward validated packet data to a target. The target may be internal (e.g. a processor or other circuitry within the node 312B) or external. The first step in forwarding to the target may be to write the cells into a command buffer 44 or a data buffer 42 (depending on the whether the cells are command or data cells). The interface circuit 318D may also provide information regarding the packet to the packet scheduler 40, which may subsequently schedule the packet for delivery to the internal target or forwarding via another interface circuit (not shown in FIG. 2).

If the CRC check circuit 32 does detect an error, an Ack packet signalling the error and providing the Ack count indicating the last known good packet may be sent by the transmit circuit 38. The packet scheduler 24 may delete correctly-received packets from the history buffer 26, and load the remaining packets back into the packet scheduler 24 to be retransmitted. Specifically, the packet scheduler 24 may drain, the interface circuit 318A may reset the link, and the packet scheduler 24 may begin resending the packets noted in the history buffer 28. In other embodiments, error handling may be performed in other fashions rather than automatically retransmitting the packets received in error.

Additionally, the transmit circuit 38 may be configured to transmit buffer release commands, which the receive circuit 10 may forward to the packet scheduler 24. The transmit circuit 38 may further transmit packets scheduled by the packet scheduler 40 (received from a different source such as one of the internal sources or another interface circuit in the node 312B), similar to the operation described for the packet scheduler 24 and the interface circuit 318A. In fact, the nodes 312A-312B may be symmetrical, in that the operations and circuitry described for each node may also be included in the other node. For simplicity, not all details have been shown in both nodes. Also, other interface circuits 318B-318C and 318E-318L may be symmetrical with the interface circuits 318A and 318D.

Generally, the packet scheduler 24 may receive packets from various internal sources (e.g. processor core 28 shown in FIG. 2, the memory controller 316A shown in FIG. 1, etc.) as well as from external sources through the various interface circuits 318A-318C. The packet scheduler 24 may store the packets directly, or may store indicators of the packets. The actual packets may be stored in distributed command and data buffers in the node 312A (e.g. similar to the command and data buffers 42 and 44 in the processing node 312B), and when a packet is scheduled, the packet data may be provided from the command and data buffers in which it is stored.

Figure 3:
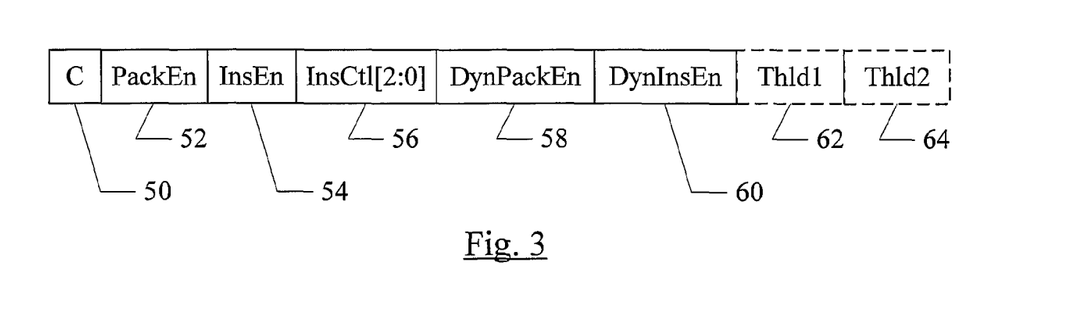
FIG. 3 is a block diagram illustrating one embodiment of control fields for a control register.

Turning now to FIG. 3, a block diagram of one embodiment of field in the control register(s) 22 is shown. Other embodiments may include additional and/or alternative data to that shown in FIG. 3. Some fields are described as bits, but may be multibit fields in other embodiments.

The fields in FIG. 3 include a capability bit 50, a pack enable bit 52, an insert enable bit 54, an insert control field 56, a dynamic pack enable bit 58, and a dynamic insert enable bit 60. Optionally, one or more threshold fields may be included (e.g. threshold fields 62 and 64).

The capability bit 50 may be a read-only bit that reports whether or not the node is capable of implementing CRC packing or partial CRC insertion. Software may check the capability bit 50 to ensure that the node is capable of performing the operations prior to enabling the functions (using the pack enable bit 52 and the insert enable bit 54, respectively). In other embodiments, separate capability bits may be provided for each type of operation.

The insert control field 56 may be coded to control which insert points in a packet are to have partial CRC insertions. In one embodiment, the data portion of the packet may be divided into N equal sized portions (or beats), where N is an integer greater than or equal to 2. For example, N may be 4 in one embodiment. Partial CRC insertion may be available between each set of beats, as well as between the command portion and the first beat. Specifically, in one embodiment, encodings may be supported that cause insertion between: (1) the first and second beats; (2) between the first and second beats and between the command and the first beat; (3) between the first and second beats, between the command and the first beat, and between the second and third IS beats; or (4) between the first and second beats, between the command and the first beat, between the second and third beats; and between the third and fourth beats. Another encoding of the insert control field 56 may be provided to indicate no insertion, and the insert enable bit 54 may be eliminated. In another embodiment, a one-hot encoding for each possible insertion point may be used to permit any combination of insertions, or other combinations of insertions may be supported. In yet another embodiment, only insertion between the first and second beats may be supported, and an insert enable bit 54 may be provided without an additional control field.

If more than two packets can be packed for one CRC transmission, there may be a pack control field to control the maximum number of packets to be packed.

The dynamic pack enable bit 58 and the dynamic insert enable bit 60 may enable dynamic variation of CRC packing and partial CRC insertions, respectively, according to the bandwidth consumption. In some embodiments, the threshold at which variation is invoked may be programmable, using one or more threshold fields 62 and 64. For example, different thresholds may be supported for the CRC packing and the partial CRC insertion. Different thresholds may be used to control different amounts of CRC packing and/or partial CRC insertions. For example, as thresholds are exceeded, fewer and fewer partial CRC insertions may be made in a packet, beginning with insertions later in the packet and moving forward, removing the insertion between the first and second beats last (after removing the insertion between the command portion and the first beat). In other embodiments, the thresholds may be fixed.

Figure 4:
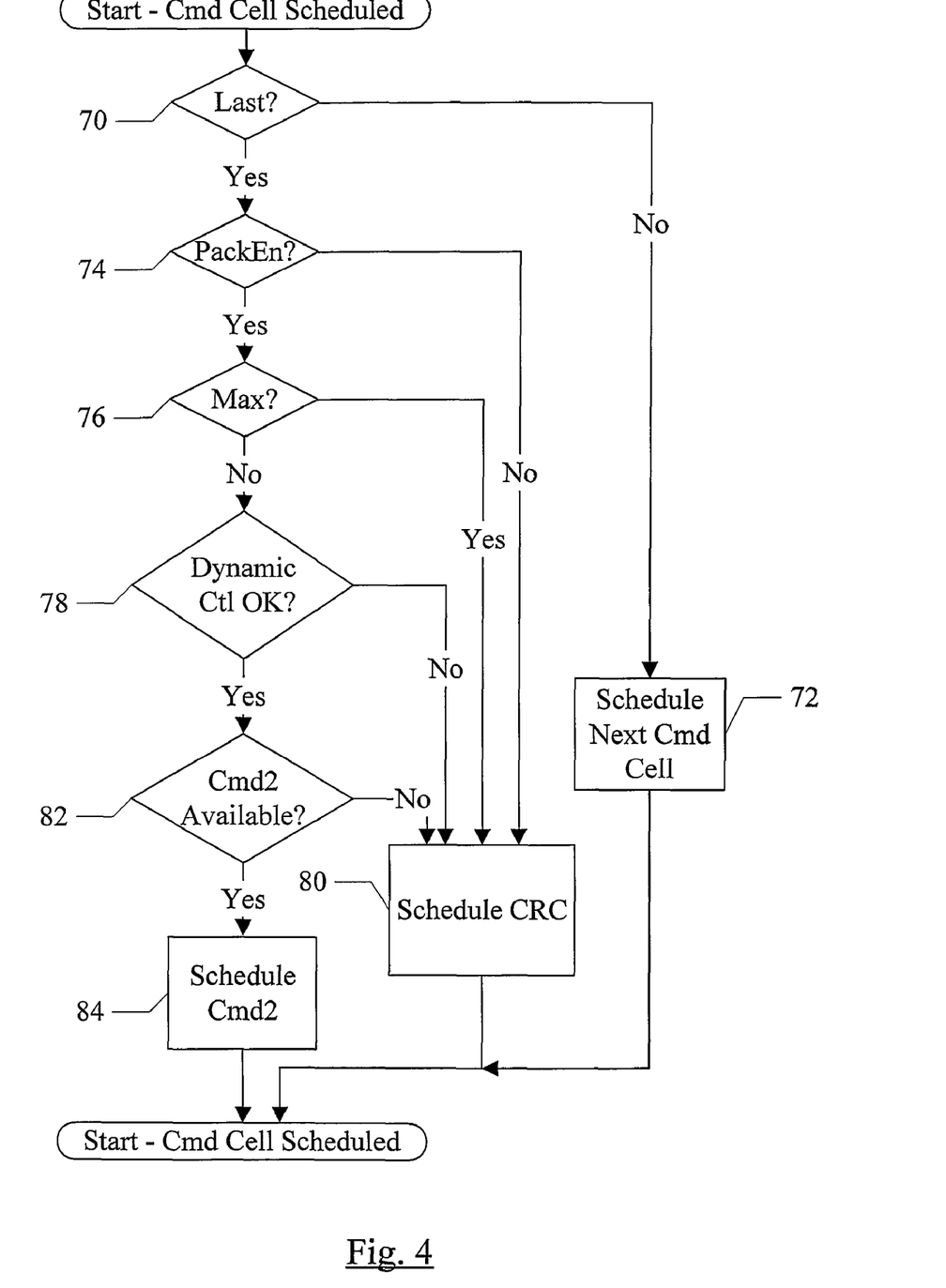
FIG. 4 is a flowchart illustrating operation of one embodiment of a cell scheduler shown in FIG. 2 to schedule a command cell.

Turning not to FIG. 4, a flowchart is shown illustrating operation of one embodiment of the cell scheduler 14 in response to scheduling a command cell (that is, a cell that is part of the command portion of a packet). Specifically, in this embodiment, the command cell is part of a dataless packet, although other embodiments may support CRC packing for packets that include data as well as command portions. The blocks are shown in a particular order for ease of understanding. However, other orders may be used. Furthermore, blocks may be performed in parallel by combinatorial logic circuitry in the cell scheduler 14. Blocks, combinations of blocks, or the flowchart as a whole may be pipelined over multiple clock cycles.

If the scheduled command cell is not the last command cell in the packet (decision block 70, "no" leg), the cell scheduler 14 may schedule the next cell in the command (block 72). If the scheduled command cell is the last command cell in the packet (decision block 70, "yes" leg), and either the CRC packing is not enabled via the enable bit 52 (decision block 74, "no" leg), the maximum number of packets have been packed (decision block 76, "yes" leg), or the dynamic control is enabled and indicates that another command should not be packed (decision block 78, "no" leg), the cell scheduler 14 may schedule the CRC cell (block 80). Additionally, if there is not another command (Cmd2) available to be scheduled (decision block 82, "no" leg), the cell scheduler 14 may schedule the CRC cell (block 80). When the CRC cell is scheduled and transmitted, the accumulated CRC maintained by the CRC generator 16 may be reinitialized to begin accumulating CRC for the next packet.

If another command is available (decision block 82, "yes" leg), the first cell of the next command (Cmd2) may be scheduled (block 84). That is, the decision of whether or not to pack a command is made at the time that the last cell of the current command is scheduled, in this embodiment. The cell scheduler 14 may not wait for another command, instead appending the CRC without packing if a second command is not available to be packed. Other embodiments may make the determination of whether or not to pack at or near the time of the scheduling of the last cell of the current packet, or at any other time, as desired.

In one embodiment, if a noop command is being transmitted (not packed with any previous command) and a command is scheduled by the packet scheduler 24, the cell scheduler 14 may pack the command with the noop command even if packing is not enabled (or is dynamically disabled currently). In this case, the reduction of latency for the command may be realized by packing the command with the noop command, rather than transmitting a separate CRC for the noop command prior to the newly scheduled command.

While the above description refers to the operation of the cell scheduler 14, the operation of the interface circuit 31 8A as a whole may be similar even if the internal structure of the interface circuit 318A differs from the embodiment of FIG. 2. For example, packets may be received for transmission, packing may be determined based on the availability of another packet to transmit, control may be dynamic based on bandwidth consumption, etc.

Figure 5:
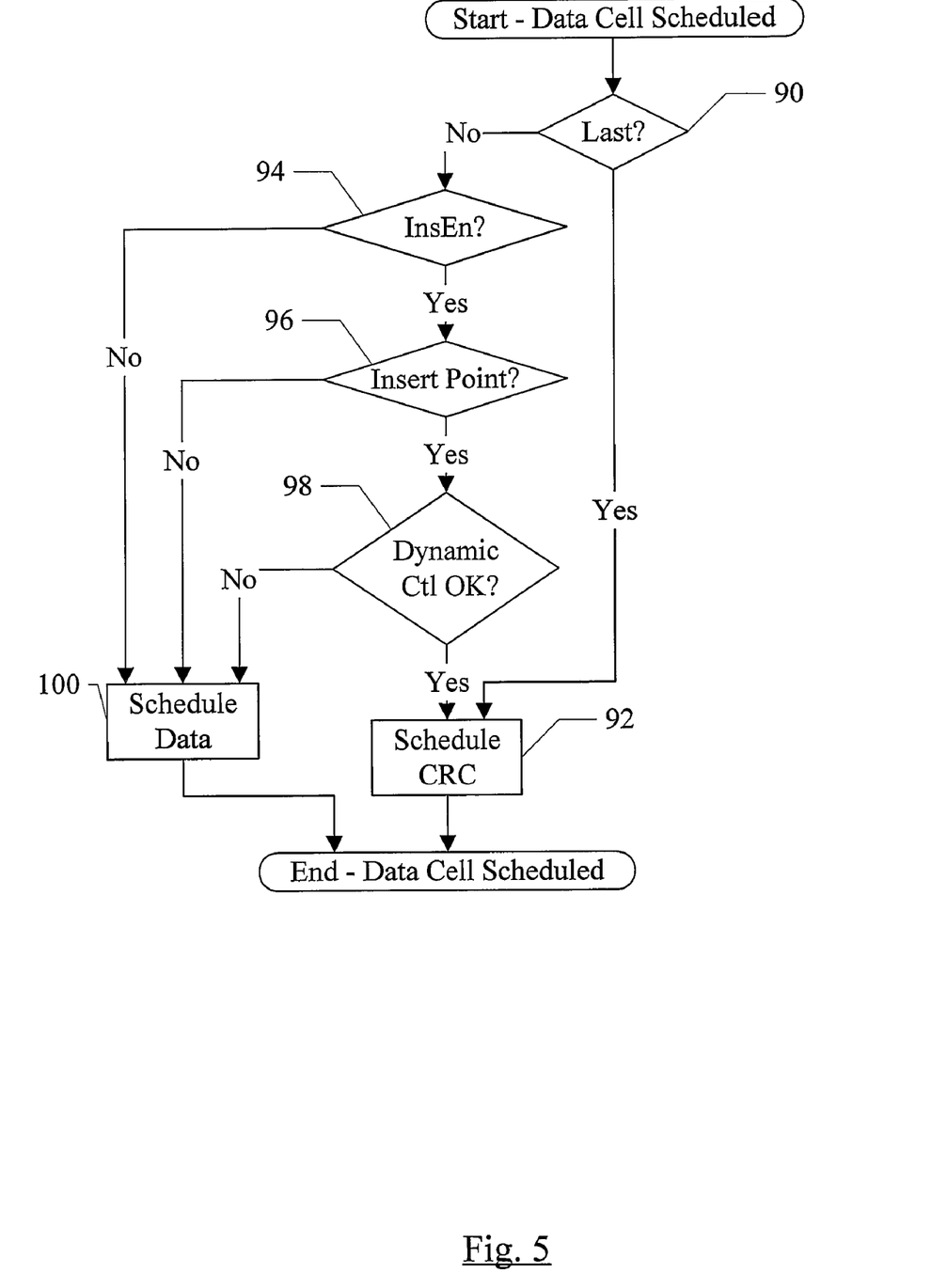
FIG. 5 is a flowchart illustrating operation of one embodiment of a cell scheduler shown in FIG. 2 to schedule a data cell.

Turning now to FIG. 5, a flowchart is shown illustrating operation of one embodiment of the cell scheduler 14 in response to scheduling a data cell (that is, a cell that is part of the data portion of a packet). The blocks are shown in a particular order for ease of understanding. However, other orders may be used. Furthermore, blocks may be performed in parallel by combinatorial logic circuitry in the cell scheduler 14. Blocks, combinations of blocks, or the flowchart as a whole may be pipelined over multiple clock cycles.

If the scheduled data cell is the last data cell in the packet (decision block 90, "yes" leg), the cell scheduler 14 may schedule the CRC cell for transmission (block 92). In this case, the CRC cell is the CRC covering the entire packet, as accumulated over the cells of the packet in previous cycles. The CRC may also be reinitialized in this case to prepare for the next packet If the scheduled data cell is not the last data cell in the packet (decision block 90, "no" leg), and either the partial CRC insertion is not enabled via the enable bit 54 (decision block 94, "no" leg), the packet is not at an insert point (decision block 96, "no" leg), or the dynamic control is enabled and indicates that partial CRC insertion should not be performed at this point (decision block 98, "no" leg), the cell scheduler 14 may schedule the next data cell (block 100). Otherwise, the cell scheduler 14 may schedule a CRC cell (block 92). In this case, the CRC cell is a partial CRC insertion covering the packet up to the current point. The CRC is not reinitialized in this case. The data packet may not be at an insert point, as indicated by decision block 96, if each beat includes more than one cell and the current cell is not the end of a beat, or if the current insert point is not enabled via the insert control field 56.

While the above description refers to the operation of the cell scheduler 14, the operation of the interface circuit 31 8A as a whole may be similar even if the internal structure of the interface circuit 318A differs from the embodiment of FIG. 2. For example, packets may be received for transmission, partial CRC insertion may be performed if enabled, control may be dynamic based on bandwidth consumption, etc.

Figure 6:
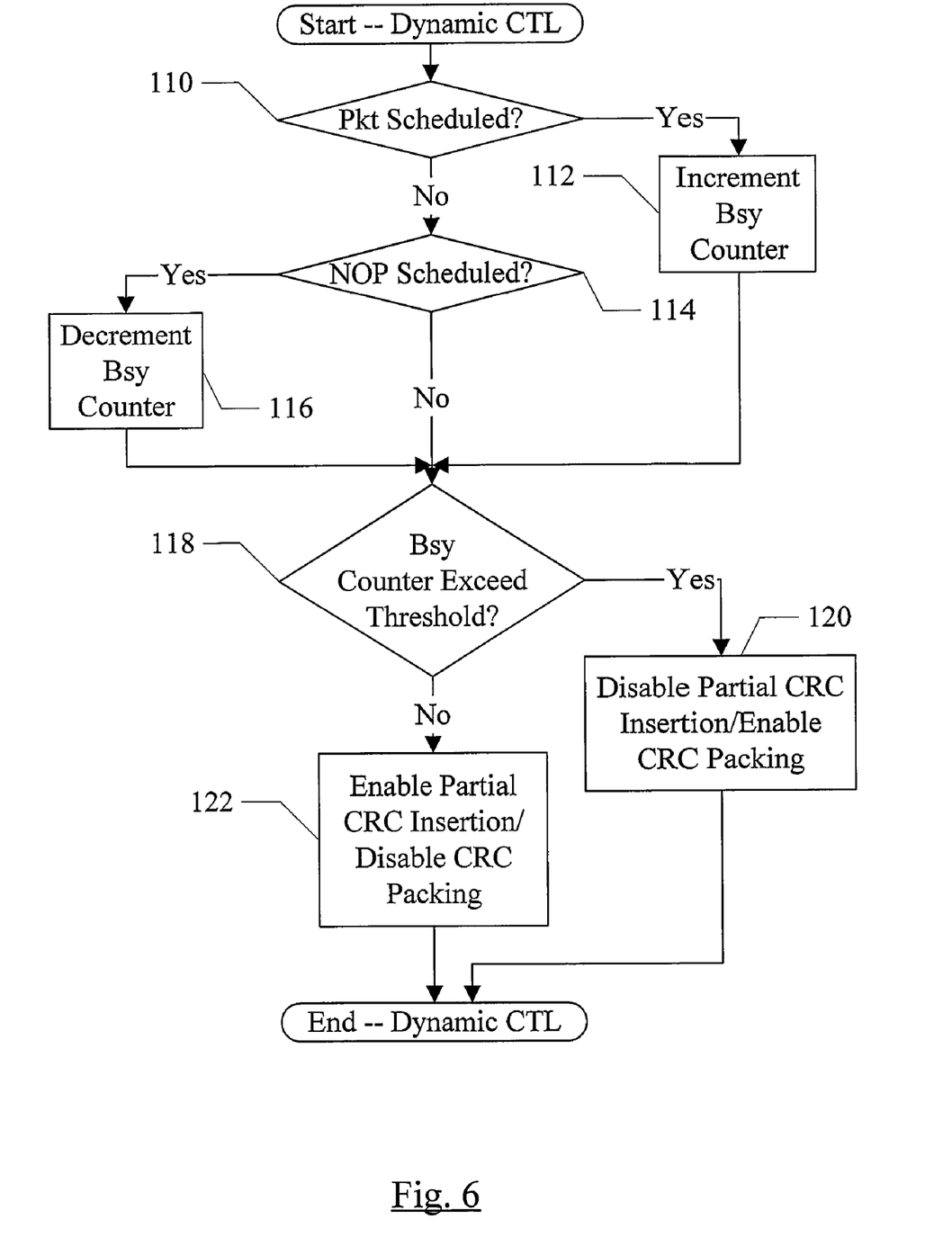
FIG. 6 is a flowchart illustrating operation of one embodiment of a cell scheduler shown in FIG. 2 to dynamically vary CRC operation.

Turning now to FIG. 6, a flowchart is shown illustrating operation of one embodiment of the cell scheduler 14 to monitor bandwidth and dynamically vary CRC packing and/or partial CRC insertion. The blocks are shown in a particular order for ease of understanding. However, other orders may be used. Furthermore, blocks may be performed in parallel by combinatorial logic circuitry in the cell scheduler 14. Blocks, combinations of blocks, or the flowchart as a whole may be pipelined over multiple clock cycles.

If the cell scheduler 14 schedules a new packet for transmission (decision block 110, "yes" leg), the cell scheduler 14 may increment the busy counter 20 (block 112). If the cell scheduler 14 schedules a noop packet (NOP packet—decision block 114, "yes" leg), the cell scheduler 14 may decrement the busy counter 20 (block 116). As mentioned previously, the busy counter 20 may be a saturating counter. That is, increments to the counter may saturate at all binary ones in the counter 20 (and subsequent increments do not change the value until a decrement occurs and reduces the value) and decrements to the counter may saturate at all binary zeros in the counter 20 (and subsequent decrements do not change the value until an increment occurs and increases the value). The value may be treated as an unsigned integer. A noop packet may be defined to be a noop packet that does not include any buffer release counts, in one embodiment, because such noop packets may be the only mechanism for transmitting the counts. It is noted that blocks 110-116 are independent of the remainder of the flowchart, and may represent monitoring the bandwidth consumption for this embodiment.

If the busy counter exceeds a threshold (decision block 118, "yes" leg), bandwidth consumption is considered high. Accordingly, partial CRC insertion may be disabled and CRC packing may be enabled, to conserve bandwidth (block 120). On the other hand, if the busy counter does not exceed the threshold (decision block 118, "no" leg), bandwidth consumption is considered low. Partial CRC insertion may be enabled to permit earlier forwarding of data and CRC packing may be disabled to improve packet forwarding latency, in such a case, since bandwidth is available and thus can be used for additional CRC transmissions without impacting performance (block 122).

Blocks 118-122 may represent part of the decision blocks 78 and 90 in FIGS. 4 and 5, respectively. That is, if dynamic control is enabled, blocks 118-122 may determine whether or not dynamic control indicates that CRC packing or partial CRC insertion is permissible. Block 120 may correspond to decision block 78, "yes" leg and decision block 90, "no" leg. Block 122 may correspond to decision block 78, "no" leg and decision block 90, "yes" leg.

As mentioned previously, in some embodiments, more than one threshold may be supported. For example, there may be thresholds corresponding to each possible combination of partial CRC insertions. As bandwidth consumption increases, the number of partial CRC insertions may be decreased, beginning with those that add the least overall value (e.g. those nearer the end of the data packet, followed by the insertion between the command portion and the data portion, and lastly the insertion between the first and second data beats). Similarly, if more than two packets may be packed for CRC, various thresholds may be used to increase (as the thresholds are exceeded) the number of packets packed for CRC.

While the above description refers to the operation of the cell scheduler 14, the operation of the interface circuit 31 8A as a whole may be similar even if the internal structure of the interface circuit 318A differs from the embodiment of FIG. 2. For example, bandwidth consumption may be monitored and dynamic control may be based on the detected bandwidth consumption.

The embodiment of FIG. 6 also illustrates a general mechanism for varying the frequency of CRC transmissions, dependent on the amount of bandwidth being consumed. As the bandwidth consumption increases, the frequency of CRC transmission is lowered (e.g. by increasing CRC packing and/or by reducing partial CRC insertions). As the bandwidth consumption decreases, the frequency of CRC transmission is increased (e.g. by inhibiting CRC packing and/or increasing partial CRC insertions).

Figure 7:
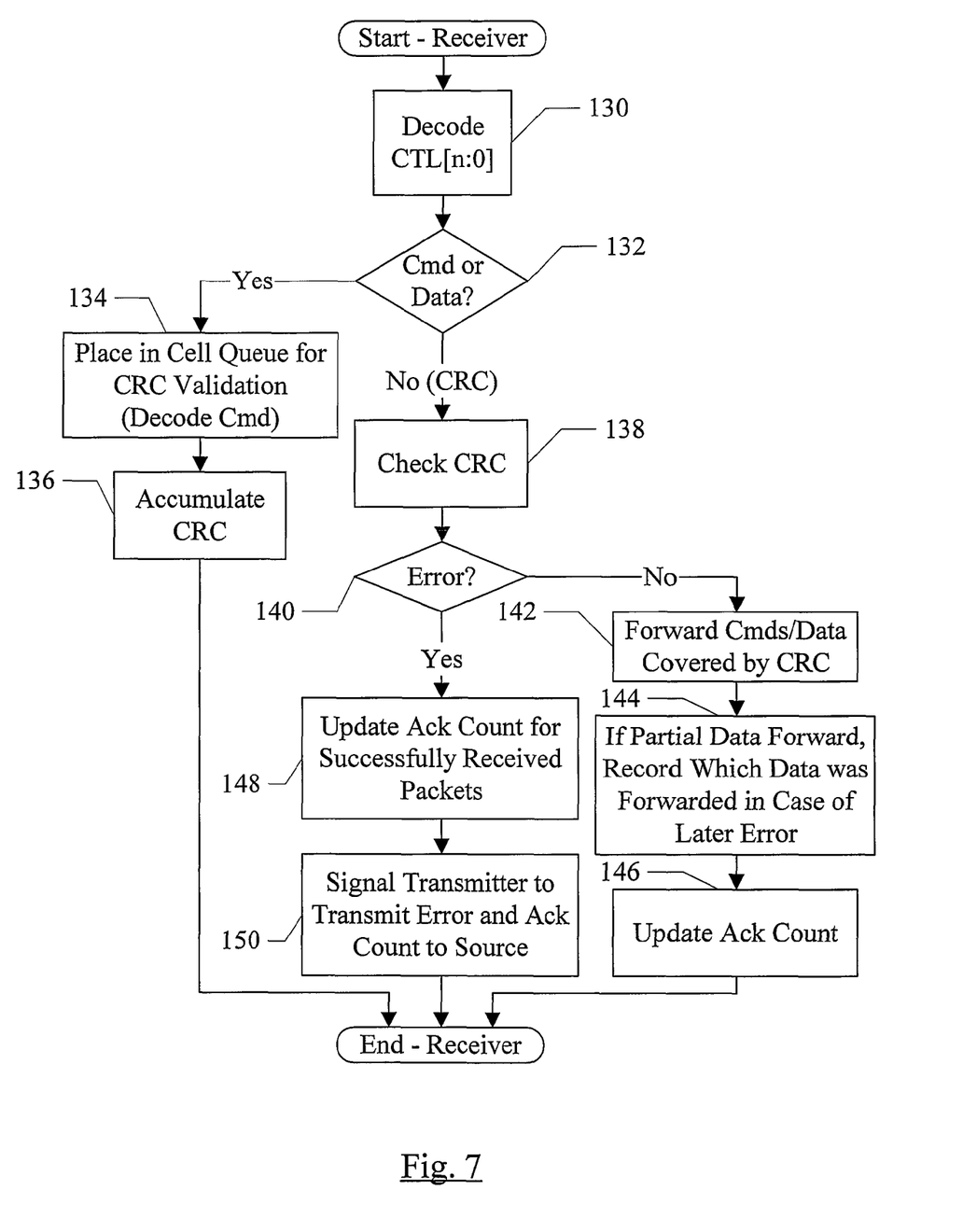
FIG. 7 is a flowchart illustrating operation of one embodiment of a receiver.

Turning now to FIG. 7, a flowchart is shown illustrating operation of one embodiment of the interface circuit 31 8D (and more specifically the receiver circuit 36 and the CRC check circuit 32, for the illustrated embodiment, although other embodiments may employ different structures) for handling packed CRC and partial CRC insertions. The blocks are shown in a particular order for ease of understanding. However, other orders may be used. Furthermore, blocks may be performed in parallel by combinatorial logic circuitry in the interface circuit 318D and/or receiver circuit 36/CRC check circuit 32. Blocks, combinations of blocks, or the flowchart as a whole may be pipelined over multiple clock cycles.

The receiver circuit 36 may decode the control data from the control lines CTL[n:0] (possibly over several bit times if a cell is received over several bit times) to determine what type of cell is received (block 130). If the cell is a command cell or data cell of a packet (decision block 132, "yes" leg), the cell may be placed in the cell queue 34 for CRC validation (block 134). Command cells may be partially decoded, e.g. to identify the virtual channel associated with the packet. The CRC check circuit 32 may accumulate the CRC from the received cell(s) (block 136). Alternatively, the cells may be placed in the cell queue 34 and the CTL data may decoded after being enqueued.

If the cell is not a command or data cell, the cell is a CRC cell (decision block 132, "no" leg). The CRC check circuit 32 may compare the CRC cell to the accumulated CRC to determine if an error has been detected (block 138). The CRC may be either a partial CRC or a full CRC. If an error is not detected (decision block 140, "no" leg), the command/data cells covered by the CRC may be forwarded from the cell queue 34 (block 142). If the forwarding is a partial forward, due to no error detected in a partial CRC, the interface circuit 318D may record which data has been forwarded (block 144). The information may be used if an error is later detected in the packet, so that previously forwarded data is not forwarded again when the packet is retransmitted. If the forwarding is the end of the packet, the Ack counter 30 may be updated (block 146), and the CRC accumulated by the CRC check circuit 32 may be reinitialized for the next packet.

If an error is detected (decision block 140, "yes" leg), the CRC check circuit 32 may update the Ack counter 30 to indicate the last successfully received packet (block 148), and the transmit circuit 38 may signal an error with the Ack count to the node 312A, for error processing (block 150).

Figure 8:
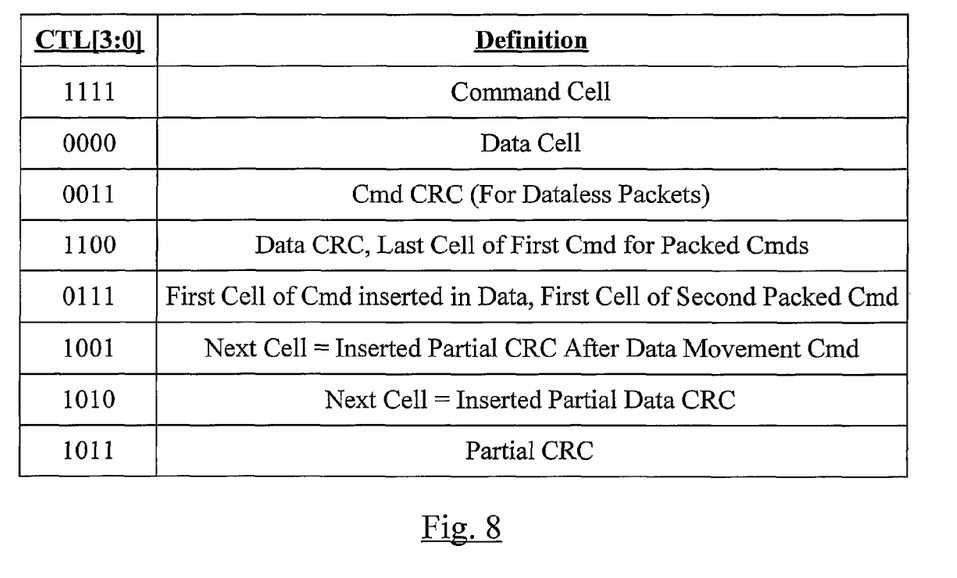
FIG. 8 is a table illustrating one embodiment of control encodings on the interconnect.

Various embodiments may encode the CTL lines for a cell in various fashions. For example, FIG. 8 is one embodiment of encoding the CTL lines for a 32 bit cell (thus having four CTL lines per cell, in this embodiment). Additionally, this embodiment packs up to two dataless packets for CRC coverage.

The CTL lines are coded b'1111' for a command cell, and b'0000' for a data cell, unless otherwise indicated in the table. The CRC for a dataless packet (command-only packet) is b'0011'. The CTL line coding of b'1100' has two meanings It may either indicate the data CRC is being provided (not a partial CRC insertion, but the final CRC appended to the end of the packet) or it may indicate the last cell of the first command for packed commands. Thus, if this CTL coding was preceded by a command cell, the cell is the last cell of the first command and if this CTL coding was preceded by a data cell, the cell is the data CRC. Furthermore, the encodings for data CRC and command CRC differ.

The CTL line coding of b'0111' also has two meanings. It is either the first cell of a command packet inserted in the data portion of another packet, or is the first cell of the second command of a pair of packed commands. Thus, the meaning of this coding may be discerned based on whether or not the preceding coding was b'1100'. Additionally, the coding for the first cell of a packed command differs from that of other command cells, which may aid identifying the first cell. Additionally, the coding for the last cell of the first command differs from other command encodings.

The CTL coding of b'1001' may be used for a command cell that precedes a partial CRC insertion after the command portion of the packet. Alternatively, the coding b'1010' may be used for a partial CRC insertion between data beats of a packet. Thus, the coding that indicates that the next cell is CRC may differ for the insertion between the command and data portions, as compared to insertions between data beats. Finally, the CTL code of b'1011' may indicate a partial CRC cell. Thus, the coding for a partial CRC cell may differ from the codings for a command CRC and a data CRC, as well as differing from other data cells.

The CTL codings indicated in the table of FIG. 8 are selected to reduce the incidence of errors on the CTL lines that can cause errors in the reception of packets. That is, if an error occurs on a CTL line, the receive circuit 36 may have a higher likelihood of detecting an invalid sequence of CTL codings, and thus may detect an error for the packet transmission.

Figure 9:
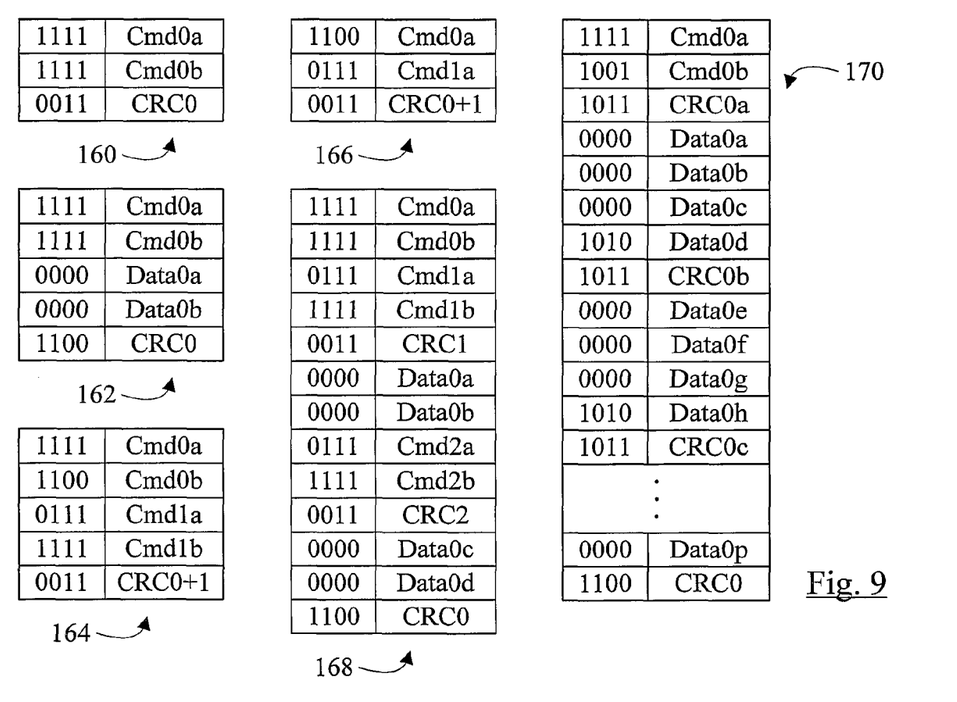
FIG. 9 is a block diagram illustrating examples of the encodings shown in FIG. 8.

FIG. 9 is a set of example packets and the corresponding CTL codings for each cell, for the encodings shown in FIG. 8. Each cell is labeled, and the CTL coding precedes the cell in the example. Generally, the cells of a command are labeled "Cmd" followed by a number (which is the same for all cells of the command), followed by a lower case letter to distinguish different cells of the same command. The cells of data are labeled "Data" followed by a number (which is the same for all cells of the same data, and is the same as the corresponding command), followed by a lower case letter to distinguish different cells of the same data.

A single (unpacked) dataless command packet having two cells (Cmd0a and Cmd0b) and corresponding CRC (CRC0) is shown at reference numeral 160. Reference numeral 162 is an example of a packet having two command cells (Cmd0a and Cmd0b) and two data cells (Data0a and Data0b). The corresponding CRC follows the data cells (CRC0).

A pair of packed command packets is illustrated at reference numeral 164, with each command packet having two cells. The command cells for the first packet (Cmd0a and Cmd0b) are followed by the command cells for the second packet (Cmd1a and Cmd1b) and the CRC that covers both packets (CRC0+1). The CTL coding for Cmd0b is thus b'1100' to indicate the last cell of the first command, and the CTL code for Cmd1a is b'0111' to indicate the first cell of the second command. Other command cells have the regular command cell coding of b'1111'. The CRC cell is also coded b'0011' to indicate the command CRC. Reference numeral 166 is an example of a pair of packed single cell commands, and thus no cells have the regular command cell coding.

Reference numeral 168 illustrates a command and data packet (Cmd0 and Data0) having two command-only packets inserted in the data portion of the packet (Cmd1 and its CRC cell CRC1, and Cmd2 and its CRC cell CRC2). As illustrated, the CTL coding of b'0111' is used for the first cell of each of commands Cmd1 and Cmd2, to signify insertion in the data. In each case, the b'0111' coding is not preceded by the b'1100' coding, and thus the commands may be detected as insertions in the data portion of the packet, and not packed commands.

Lastly, reference numeral 170 is an example of a packet having partial CRC insertions (CRC0a, CRC0b, and CRC0c), illustrating the signalling of the next cell as partial CRC, except for the final CRC (CRC0).

Figure 10:
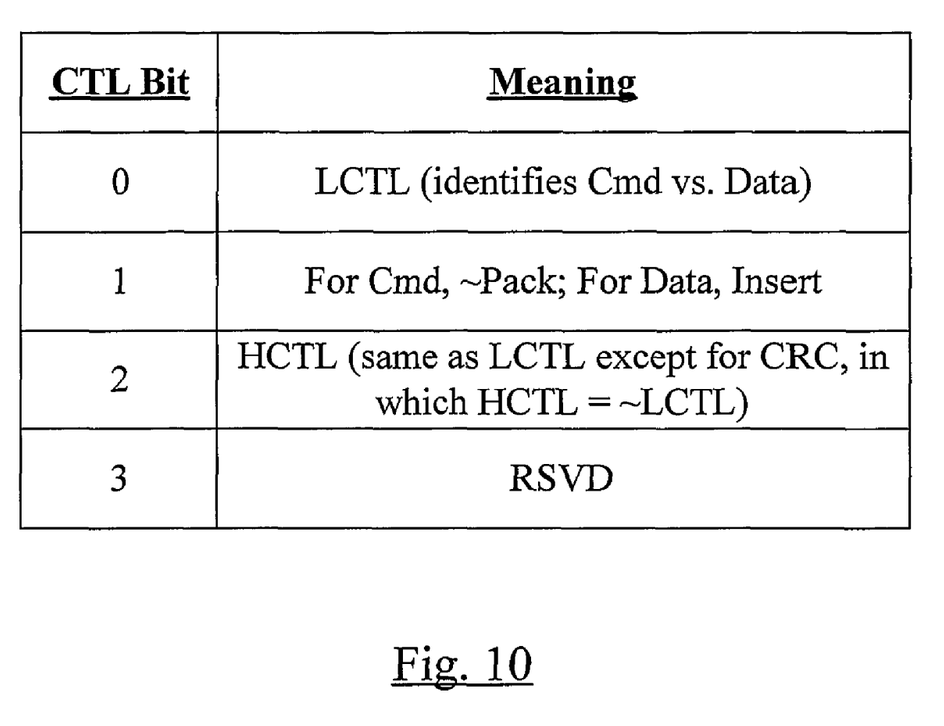
FIG. 10 is a table illustrating another embodiment of control encodings on the interconnect.

FIG. 10 is another embodiment of the coding of the CTL lines for a 32 bit cell and four CTL lines per cell. In this embodiment, each bit position of the CTL lines corresponding to the cell (bits 0 to 3) is assigned a different meaning. The LCTL and HCTL codings for bit positions 0 and 2 may be the same as that defined in the HT specification. These bits determine whether a cell is a command cell or data. Bit position 1 may be defined for command cells to be a Pack bit. That is, if the bit is 0, the next cell transmitted will be another command cell. If the bit is a 1, the next cell transmitted will be the CRC for the command. Bit position 1 may be defined for data cells to be an Insert bit. If the bit is 0, the next cell is another data cell (or an inserted command cell). If the bit is 1 the next cell is a partial CRC insertion cell. Bit position 3 is reserved.

Numerous variations and modifications will become apparent to those skilled in the art once the above disclosure is fully appreciated. It is intended that the following claims be interpreted to embrace all such variations and modifications.

What is claimed is:

1. A node configured to couple to a link, the node comprising:
   a packet scheduler configured to schedule a packet to be transmitted on the link, the packet comprising a command and associated packet data; and
   an interface circuit coupled to the packet scheduler and configured to transmit the packet on the link, wherein the interface circuit is configured to generate error detection data covering the packet, and wherein the interface circuit is configured to transmit the error detection data at an end of the packet, the error detection data covering the packet, and wherein the interface circuit is further configured to insert at least one partial error detection data within the packet, the partial error detection data covering a portion of the packet, wherein the portion of the packet precedes the partial error detection data within the packet, and wherein the interface circuit is configured to dynamically vary the insertion of partial error detection data dependent on an amount of bandwidth consumed on the link.

2. The node as recited in claim 1 wherein the packet data is divided into N equal-sized beats, where N is an integer greater than or equal to two, and wherein the interface circuit is configured to insert the partial error detection data between the first and second beats.

3. The node as recited in claim 2 wherein the interface circuit is configured to insert another partial error detection data between the command and the first beat.

4. The node as recited in claim 2 wherein the interface circuit is configured to insert another partial error detection data between the second and third beats.

5. The node as recited in claim 4 wherein the interface circuit is configured to insert yet another partial error detection data between the third and fourth beats.

6. The node as recited in claim 1 wherein the packet is transmitted as a set of cells on the link, and wherein the link comprises lines to carry the cells and one or more control lines, and where the interface circuit is configured to encode data on the control lines to identify a given cell, and wherein the encoding for a last data cell before the partial error detection cell is different from the encoding for other data cells.

7. The node as recited in claim 6 wherein the encoding for the partial error detection cell is different from the encoding for the last data cell and for other data cells.

8. The node as recited in claim 7 wherein the encoding for the error detection cell at the end of the packet differs from the encoding for the last data cell, the other data cells, and the partial error detection cell.

9. The node as recited in claim 1 wherein, if the amount of bandwidth consumed is less than a threshold, the number of insertions is higher and wherein, if the amount of bandwidth consumed is greater than a threshold, the number of insertions is lower.

10. A method comprising:
scheduling a packet to be transmitted on a link, the packet comprising a command and associated packet data;
generate error detection data covering the packet;
transmitting the packet on the link;
transmitting the error detection data at an end of the packet, the error detection data covering the packet;
inserting at least one partial error detection data within the packet, the partial error detection data covering a portion of the packet, wherein the portion of the packet precedes the partial error detection data within the packet; and
dynamically varying the insertion of partial error detection data dependent on an amount of bandwidth consumed on the link.

11. The method as recited in claim 10 wherein the packet data is divided into N equal-sized beats, where N is an integer greater than or equal to two, and wherein the inserting at least one partial error detection data comprises inserting the partial error detection data between the first and second beats.

12. The method as recited in claim 11 wherein the inserting at least one partial error detection data further comprises inserting another partial error detection data between the command and the first beat.

13. The method as recited in claim 11 wherein the inserting at least one partial error detection data further comprises inserting another partial error detection data between the second and third beats.

14. The method as recited in claim 13 wherein the inserting at least one partial error detection data comprises inserting yet another partial error detection data between the third and fourth beats.

15. The method as recited in claim 10 wherein, if the amount of bandwidth consumed is less than a threshold, the number of insertions is higher and wherein, if the amount of bandwidth consumed is greater than a threshold, the number of insertions is lower.

16. A node configured to couple to a link, the node comprising:
an interface circuit coupled to receive a packet from the link, wherein the packet comprises a command, associated packet data, error detection data appended to an end of the packet, and at least one partial error detection data inserted within the packet; and
a target for the packet, wherein the interface circuit is configured to verify a portion of the packet that is received prior to the partial error detection data wherein the interface circuit is configured to verify the portion using the partial error detection data responsive to receiving the partial error detection data and wherein, responsive to detecting that no error occurred in the portion, the interface circuit is configured to forward the portion prior to receiving a remainder of the packet, and wherein the interface circuit is configured to detect a dynamic variation of the insertion of partial error detection data, the dynamic variation being dependent on an amount of bandwidth consumed on the link.

17. The node as recited in claim 16 wherein the interface circuit is configured to record which portions of the packet have been forwarded.

18. The node as recited in claim 17 wherein the interface circuit is configured to receive the remainder of the packet, and wherein, if the interface circuit detects an error in the remainder, the interface circuit is configured to report the error to the transmitter on the link.

19. The node as recited in claim 18 wherein the interface circuit is configured to receive the packet again, and wherein the interface circuit is configured to inhibit forwarding portions that were previously forwarded.

20. The node as recited in claim 18 wherein the interface circuit is configured to forward the remainder and to insert an error in the remainder to ensure that the target detects the error.

21. The node as recited in claim 16 wherein the packet data is divided into N equal-sized beats, where N is an integer greater than or equal to two, and wherein the partial error detection is inserted between the first and second beats, and wherein the partial error detection data covers the command and the first beat.

* * * * *